(12) United States Patent
Fuisz et al.

(10) Patent No.: US 6,171,607 B1
(45) Date of Patent: *Jan. 9, 2001

(54) PROCESS AND APPARATUS FOR PRODUCING SHEARFORM MATRIX MATERIAL

(75) Inventors: Richard C. Fuisz, McLean; Claude Bayard, Arlington; Beuford A. Bogue, Broad Run; Eric H. Mathews, Gainesville; Supapong Siris, Chanitilly, all of VA (US)

(73) Assignee: Fuisz Technologies Ltd., Chantilly, VA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/162,189

(22) Filed: Sep. 28, 1998

(51) Int. Cl.$^7$ ............................................. A01N 25/00
(52) U.S. Cl. ..................... 424/405; 424/400; 424/406; 264/13; 264/14
(58) Field of Search ....................... 264/11; 424/405, 424/400, 408

(56) References Cited

U.S. PATENT DOCUMENTS

| | | | |
|---|---|---|---|
| 4,855,326 | 8/1989 | Fuisz | 514/777 |
| 4,873,085 | 10/1989 | Fuisz | 424/400 |
| 4,997,856 | 3/1991 | Fuisz | 514/777 |
| 5,028,632 | 7/1991 | Fuisz | 514/772 |
| 5,034,421 | 7/1991 | Fuisz | 514/772 |
| 5,348,758 * | 9/1994 | Fuisz et al. | 426/660 |
| 5,380,473 | 1/1995 | Bogue et al. | 264/11 |
| 5,429,836 * | 7/1995 | Fuisz | 426/601 |
| 5,511,961 * | 4/1996 | Sullivan | 425/9 |
| 5,518,730 * | 5/1996 | Fuisz | 424/426 |
| 5,683,720 * | 11/1997 | Myers et al. | 424/489 |

* cited by examiner

Primary Examiner—Thurman K. Page
Assistant Examiner—P. E. McQueeney
(74) Attorney, Agent, or Firm—John F. Levis; Richard D. Schmidt

(57) ABSTRACT

The present invention is a unique process and apparatus for making a new matrix material called a shearform matrix which results in transformation of the morphology of a feedstock. The process is characterized by increasing the temperature of a nonsolubilized feedstock carrier to a point where it will undergo internal flow, followed by upwardly ejecting a stream of the feedstock and then subjecting it to disruptive fluid shear force which separates it into separate parts or masses which have a transformed morphology. The shearform matrix may include other ingredients such as oleaginous material and actives.

40 Claims, 5 Drawing Sheets

PROCESS AND APPARATUS FOR PRODUCING SHEARFORM MATRIX MATERIAL

BACKGROUND OF THE INVENTION

The present invention relates to a unique process and apparatus for making shearform matrix material resulting from transformation of the morphology of feedstock material.

The art of material processing has developed significantly in recent years. In U.S. Pat. No. 4,855,326 various substances having pharmological properties are combined with saccharides and spun to produce a readily water-soluble product. Other disclosures which relate to spinning substances with one or more saccharides are found in U.S. Pat. No. 4,873,085, U.S. Pat. No, 5,034,421, U.S. Pat. No. 4,997,856 and U.S. Pat. No. 5,028,632. U.S. Pat. No. 5,034,421 discloses spun matrix systems containing medicaments having predetermined release patterns.

The examples in the disclosures set forth above describe processing feedstock material by subjecting it to high speed spinning on a spinning head in which the substance is also subjected to heating against a heating element. The change of temperature is quite rapid, which is believed to be occasioned by the spinning head quickly and efficiently spreading the feedstock material against the heating element circumferentially disposed around the perimeter of the spinning head. Thus, extensive surface contact of the feedstock is provided against the heating element itself while being spun.

The feedstock material is heated sufficiently to create an internal flow condition which permits part of the feedstock to move at what is believed to be a subparticle level with respect to the rest of the mass and exit openings provided in the perimeter of the spinning head. The centrifugal force created in the spinning head flings the flowing feedstock material outwardly from the head so that it reforms with a changed structure. The force required to separate and discharge flowable feedstock is only the centrifugal force which results from the spinning head. These examples describe one approach to producing a novel matrix material.

A further reference, U.S. Pat. No. 5,380,473, sets forth a process in which the temperature of a nonsolubilized feedstock carrier is increased to a point where it will undergo internal flow, followed by ejecting a stream of the feedstock and then subjecting it to disruptive fluid shear force which separates it into separate parts or masses which have a transformed morphology. Also disclosed in the '473 reference is an apparatus with a high pressure nozzle for changing the morphology of the feedstock. The nozzle is directed downwards which has advantages in that material is being expunged therefrom to coincide with the downward pull of gravity. However, it has now been discovered that on a commercial scale a downwardly-directed nozzle must be suspended from a rather large height so that the large quantity of exiting material can fully and completely dry in the air before reaching a bottom collection mechanism. This necessitates extra space and volume in a processing center.

It is an object of the present invention to overcome certain drawbacks which are associated with the above-cited apparatus and procedures. It is also an object of the present invention to provide improvements over the technology previously set forth in the art.

SUMMARY OF THE INVENTION

The present invention is a unique process and apparatus for making a shearform matrix by raising the temperature of a feedstock material which includes a non-solubilized carrier to a point where the carrier undergoes internal flow upon application of an internal fluid shear force. The feedstock is advanced while undergoing internal flow and is then ejected upwardly while in internal flow condition, and subjected to disruptive fluid shear force to form multiple parts or masses which have a morphology different from that of the original feedstock.

The multiple masses are cooled substantially immediately after contact with the fluid shear force and are permitted in accordance with the present invention to fall in a free-flow condition after being propelled upwards, until they are solidified. Accordingly, conditions are provided at the point of shear whereby the feedstock is maintained in a free-flow condition until the new masses are beyond the shearing step. This is preferably accomplished by a steady, yet gentle stream of low pressure air surrounding the nozzle and directed upwards which helps to prevent processed material from falling onto and clogging the nozzle apparatus. Because the material is in a substantially dry form when exiting the nozzle, this low pressure air is sufficient to have the material retain its buoyancy, and free fall away from the apparatus. The low pressure air further serves to remove any remaining moisture as well.

Ideally the temperature of gas is controlled when used as the disruptive shear-producing fluid. In certain embodiments, those skilled in the art will find that the temperature may be controlled to provide a gas temperature which is at least $0.1°$ C. greater than the flow point temperature of material being ejected for each atmosphere of pressure of gas applied against said material as a shear force. Thus, if there are 10 atmospheres of pressure applied, the temperature of gas should preferably be at least $1°$ C. greater than the temperature of the material being ejected. This feature has often been found to optimize the shearing effect and maintain the ejected feedstock in free-flow condition until it is separated and has traveled beyond the shear step.

The feedstock material used in the present process is one which includes a carrier selected from the group consisting of saccharide-based materials/thermoplastic polymers, biodegradable polymers and cellulosics. Preferably the feedstock material is organic, that is most compounds of carbon. Basically, the feedstock is selected for use herein based on the ability to be processed without reliance upon dissolution. The feedstock material may contain minor amounts of material which is dissolved, but the processability of the feedstock relies on a carrier capable of undergoing internal flow without the necessity of dissolution. In the case of saccharide-based materials, the feedstock is primarily a solid material which is subjected to the process.

The term saccharide-based materials includes sugars and sugar derivatives. Sugars are referred to in a classical sense which means sucrose, maltose, fructose, lactose, glucose, dextrose, polydextrin, maltose, arabinose, xylose, galactose, et al. Sugar alcohols are also included in the term sugars. A non-limiting list of sugar alcohols includes the following: sorbitol, mannitol, maltitol, pentatol, isomalt (Palatinit®), xylitol, et al. Sugar derivatives include chemical and enzymatic derivatives and includes, but is not limited to, chloro derivatives of sugar such as sucralose.

Saccharide-based materials can have varying degrees of low-monomer saccharides, or sugars, oligomers, and polysaccharides, such as starch. Some saccharide-based materials are prepared by hydrolysis of starch and are classified by the degree of starch polymer hydrolysis. The measuring unit is referred to as D.E. or dextrose equivalent.

D.E. is defined as reducing sugars expressed as dextrose and reported as a percentage of the dry substance.

For example, maltodextrins contain a mix of sugars and polysaccharides which range from long-chain oligomers resulting from starch hydrolysis to sugars having a low number of monomeric units. Under FDA guidelines maltodextrin consists of nonsweet, nutritive saccharide polymers having a D.E. of less than 20, while corn syrup solids is regarded by the FDA as having a D.E. greater than 20. The present inventors, however, refer to maltodextrins collectively as saccharide-based material consisting of nonsweet, nutritive saccharide polymers and other oligomers having six-carbon monomer units which collectively provide a carrier material capable of forming a matrix. In all uses, the carrier material in the present invention is nonsolubilized.

In a preferred embodiment of the present invention, other materials can be included in the feedstock. For example, oleaginous material can be included in the feedstock which, among other things, can act as a crystallization-control agent. By crystallization-control agent is meant that the matrix which is formed as a result of the present process and apparatus can be in an amorphous condition and subjected to an environment in which it will crystallize in a controlled manner. Other hydrophobics may be used as a control for crystallization and are contemplated to be part of the present invention. Some of the oleaginous materials which are contemplated for use in the present invention are as follows: vegetable oils, soy bean oil, canola oil, corn oil, cocoa butter, sunflower oil, animal fats, tallows, lards, fish oils, crustacean oils, and mixtures thereof. It is within the scope of the invention to include greater than 50% by weight of oleaginous material (as measured in the final processed product) for processing with the feedstock material.

The feedstock can also contain an additive selected from the group consisting of bioeffecting agents (e.g. drugs and pharmaceuticals, food substances and nutraceuticals), dyes, fragrances, crystallization control agents, sweeteners, flavors, and mixtures thereof. A non-limiting list of bioeffecting agents is found in U.S. Pat. No. 5,380,473, the salient portion of which is incorporated herein by reference.

Since a number of bio-affecting agents are heat sensitive, the present invention includes a process step of introducing heat sensitive agents at a point sufficiently proximal the ejection step to reduce exposure of the heat sensitive to prolonged heat conditions. Thus, any heat sensitive agent can be incorporated into a carrier for subsequent ejection and formation of a shearform matrix product.

In order to implement the process, an apparatus is provided which has a means for increasing the temperature of a non-solubilized feedstock and simultaneously increasing the applied pressure on the feedstock to advance it for ejection. Preferably, this means for increasing and advancing the feedstock can be a multiple heating zone twin screw extruder. Preferably there are greater than four (4) zones, and in the present preferred mode there are seven (7) zones or more. It is within the scope of the invention to have up to nine (9) zones, and even more, depending upon the need of the skilled artisan.

The second element of the apparatus is a means for ejecting the feedstock in a condition for shearing it to provide the shearform matrix. The means for ejecting is in fluid communication with the means for increasing the temperature and pressure and is arranged at a point to receive the feedstock while it is in the internal flow condition. Preferably this means for ejecting the feedstock is a nozzle which provides high pressure ejection of the feedstock material. In order to maintain the free-flow condition of the matrix beyond the point of shear, it is preferable to include temperature-maintenance means throughout the means for ejecting. It is further desirable that the means for ejecting the feedstock be positioned so as to expunge the material in an upwards fashion, that is substantially at about a ninety degree angle relative to the horizontal.

In a preferred embodiment, the apparatus can also include a port or other entry device for introducing an additive or agent to the carrier at a point close enough to ejection to prevent or minimize degradation of the agent. In this way heat sensitive agents can be introduced without fear of losing their activity—e.g., bio-affecting properties.

Finally, the apparatus includes a means for shearing the feedstock which is arranged proximally to the ejector and is disposed to effect shear of the feedstock while it is in the internal flow condition. Preferable the means for shearing is a means for delivering fluid such as air at high velocity against the feedstock stream as it exits a nozzle. Such a device can be an external atomizing nozzle. In one embodiment the air provided for shearing can be heated to enhance the free-flow of the separated masses beyond the point of shear.

In an alternative embodiment, the means for shearing can be a chamber in which the environment can be maintained to induce shear upon the collision of a high velocity stream of feedstock directed against the preselected and maintained environment. Generally, the temperature and humidity of the shearing environment is maintained at a level which induces shear in feedstock (having internal flow) directed against this environment at high velocity.

As a result of the present invention dry emulsions based on material capable of breaking down at high temperatures can be prepared. The process is highly controllable and is able to produce high volumes of shearform matrix with tight control of temperatures and/or low high-heat residence times which minimize degradation of the feedstock or feedstock additives.

The present invention has been shown to provide a shearform product which has a more amorphous structure, e.g., more random, than a product prepared from a solution process. The resulting matrix is capable of dispersing more oil in water than with spun product. This is demonstrated by greater tyndall effect. Thus, a maltodextrin having a given D.E. will disperse a greater amount of oil as a shearform product than as a spun product. This is believed to be the result of producing a greater number of finer particles which carry oil than can be produced by spinning. Also a much more stable dispersion can be established. In order to separate oil from a dispersion created with a shearform matrix ether or hexane is required whereas heat and centrifugation is generally suitable for separating oil from a dispersion resulting from a spun matrix.

In addition, the apparatus of the invention provides a novel collection bin which holds the shearform matrix product material after free-fall from the apparatus.

BRIEF DESCRIPTION OF THE DRAWINGS

FIG. 1 is a schematic of the overall process and apparatus with the shear region detailed in FIGS. 2 and 3;

FIG. 2 is a detailed schematic of the encircled shear region II of FIG. 1; and FIG. 2*a* is a schematic as shown in FIG. 2 with phantom lines depicting a preferred embodiment which provides introduction of an additive without prolonged heating; and FIG. 3 is yet a further detail schematic of the preferred ejection arrangement for the preferred embodiment of the present invention.

DETAILED DESCRIPTION OF THE PREFERRED EMBODIMENTS

Figure 1:
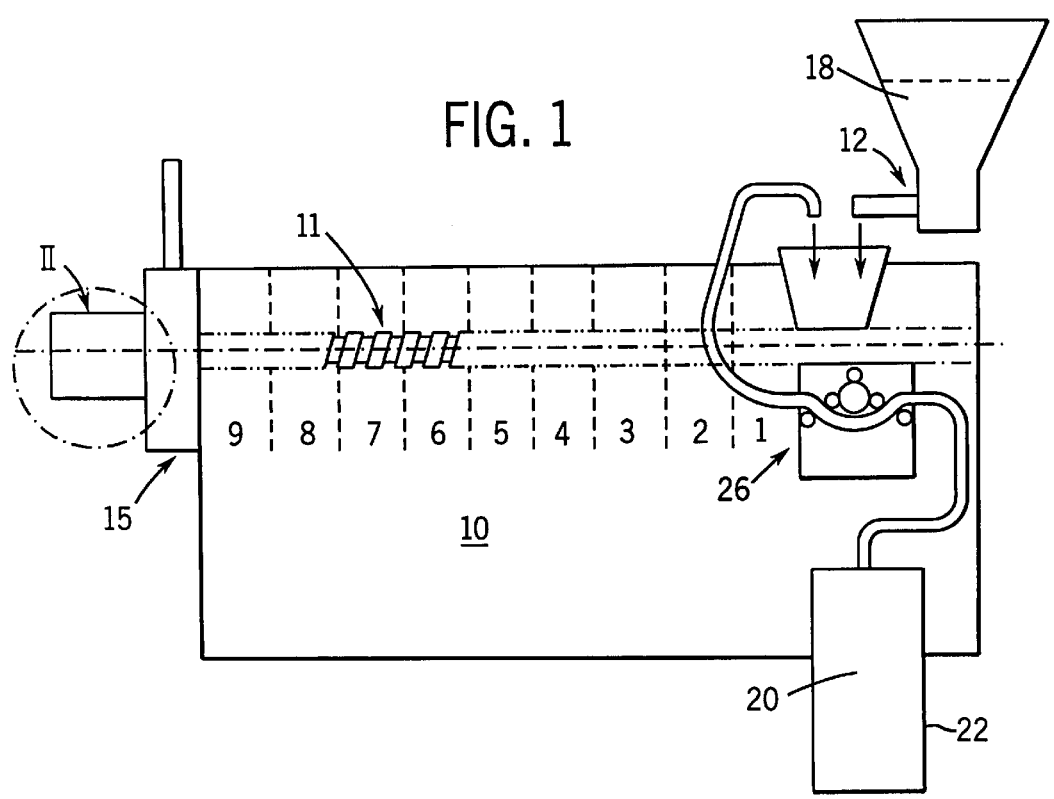

A shearform matrix according to the present invention is a matrix formed by transformation of a feedstock having a carrier material which has a structure capable of being altered by heating. The feedstock material is heated sufficiently to permit transformation of the morphology of the carrier when it is subjected to a shear force. The condition at which this morphology occurs is referred to herein as internal flow. Internal flow contemplates the ability of the material to move and separate at subparticle level sufficiently to cause discontinuity in the feedstock. In the context of the present invention an external fluid shear disruptive force is then applied to the stream of feedstock rather abruptly over a very short period of time so that the duration of this external force can be considered instantaneous. The inventors have found that in a presently preferred embodiment of the invention, the feedstock can be subjected to a stream of fluid, gas or liquid, impacting the feedstock at a velocity which creates the external flash disruptive shear force. It is this external force which is created by fluid impinging against the feedstock that is referred to as disruptive fluid shear force.

Presently, the preferred fluid is air. However, the invention is not limited to the type of fluid used to create the disruptive fluid shear force.

In one embodiment air is directed against the feedstock as a continuous high velocity jet. Another embodiment contemplates propelling the feedstock at high velocity against the force of an air atmosphere. In both cases the feedstock is abruptly disrupted into discrete discontinuous masses due to external shear force acting on the feedstock material while it has internal flow.

Another characteristic of the shearform matrix of the present invention is a morphology which results from allowing flash shear-disrupted feedstock to reform during free flow transformation from its original morphology. This unique free-flow transformation is achieved by preventing hindrance of continued flow while the material cools to a new matrix structure. It has now been discovered that this process is significantly enhanced if the shearform matrix material exits the apparatus in a substantially upwards direction, rather than downwards, the latter taking full advantage of the effects of gravity. Previously, it had been thought that upwards expulsion would be inefficient due to the attempted workings against gravity, as well as the increased likelihood of clogging the apparatus as exiting material went into free fall and landed back onto the apparatus. However, because the material is substantially dry and lightweight, the addition of low pressure air moves the material away from the apparatus, while at the same time imparts a final drying action thereto. In this manner, a significant vertical space savings is accomplished as less room is required to process the material. It is therefore within the scope of the invention that the novel processing apparatus herein described reduce the amount of vertical space necessary for successful processing by up to about 20%, and preferably about 50%, and most preferably by about 75% or more, as compared to an apparatus in which material is expelled in downwardly directed manner.

Referring to FIG. 1, one apparatus of the invention has a twin screw extruder 10 which provides the chamber in which the feedstock material is heated. Heating is controlled in the series of heating zones 1–9.

The feedstock 18 is fed into the chamber from hopper/feed 12 in non-solubilized condition. By nonsolubilized in the present invention is meant that the ingredients have not been subjected to dissolution for purposes of processing. A small amount of water (or other agents) may be used as a processing aid to ensure smooth flow, and assist generally in the advancement of the throughput. These processing aids are not provided, however, to change the nature of the feedstock from non-solubilized to solubilized.

The multiple-zone twin screw extruder has been used to effect controlled heating and feeding. The multiple zones are used to heat the feedstock sufficiently to attain the temperature and fluid shear forces necessary for internal flow to occur. Inasmuch as the temperature is increased inherently as a result of friction occurring during mixing and displacement with most feedstock materials externally supplied temperature can be reduced to a certain extent to accommodate the autologous temperature produced during extrusion. In one embodiment of the invention, extrusion was performed using a APV Baker MPF50 twin-screw co-rotating extruder with an L:D ratio of 25 to 1. Up to nine temperature zones were provided for applying controlled heating between input and exit. Screw configurations can be adjusted to meet the internal fluid shear requirements of the process.

An important factor in the present invention is to heat and extrude feedstock under conditions of fluid shear to attain a condition at which internal flow is possible without going substantially beyond such point or creating an extended residence time in the extruder. This balance is achieved by selecting proper machine size, adjusting volume of throughput, selecting the optimum screw design and heating at the separate zones to ensure that internal flow condition is met but not exceeded for the particular type of material being processed. Consequently, as soon as the proper condition is achieved, the extrusion is terminated by passing the feedstock through an ejection means such as a nozzle.

In the experiments which are described hereinafter, sugar as the carrier material was processed with oleaginous material, and the balance of temperature and time as explained in the preceding paragraph was satisfied by providing a seven zone temperature profile and advancement speed set forth in Table I. Consequently, the sugar feedstock did not reside in the final three zones, i.e., Zones 5, 6, and 7 for more than about 90 seconds.

In all cases, the feedstock was heated and advanced at a rate which provided internal flow conditions without substantially heating beyond such point and with minimum residence time under such conditions. Over-extension of either temperature or time results in deterioration of the carrier as well as creating of a non-processable mass of feedstock.

Additional ingredients 20, such as oleaginous material can be stored in reservoir 22 and metered into the feedstock by a pump 26. The mixing, pressurizing and advancing elements are shown schematically as screw 11. A head clamp or adaptor plate 15 has also been provided to direct the throughput of feedstock from the extruder to the shearing portion of the apparatus designated by circle II. A detailed depiction of this region is provided in FIG. 2.

Figure 2:
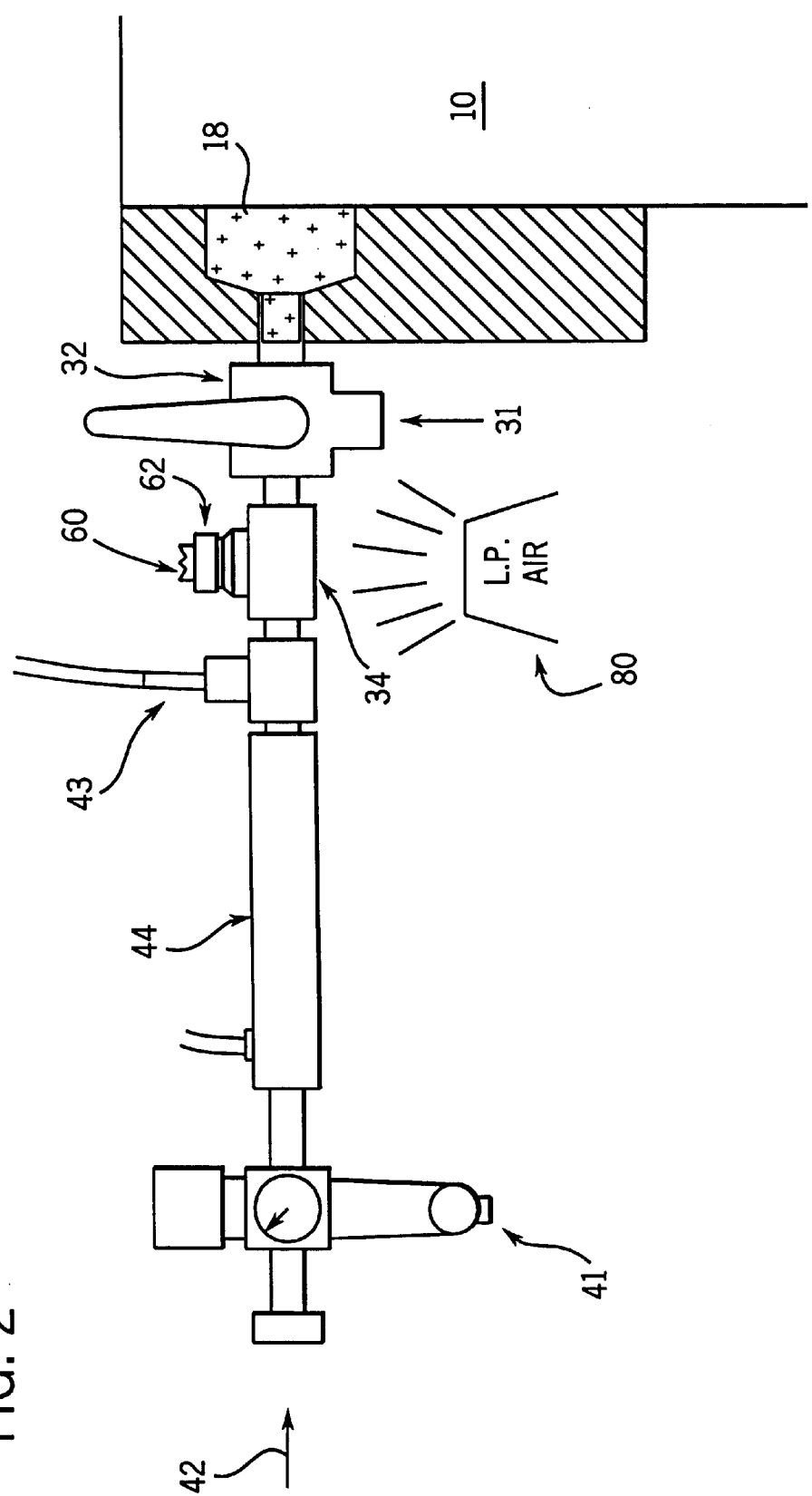

Referring to FIG. 2, the ejection portion of the apparatus and process is schematically depicted. Specifically, feedstock 18 is derived from extruder 10 under pressure and permitted to advance by use of a valve mechanism 32. Preferably a 3 port valve is used to direct the extruded mass to an alternate outlet such as port 31 if required. Immediately downstream of the valve mechanism is a high pressure nozzle 34.

In the present preferred embodiment, the nozzle is a high pressure, low velocity nozzle which extrudes a substantially coherent stream of feedstock. In an alternative embodiment, the nozzle can be a high velocity nozzle which extrudes the feedstock under high pressure and at high velocity. As shown in FIG. 2, the nozzle is directed substantially upwards. While those skilled in the art may find the precise position therefor, it is recommended hat the nozzle be positioned about 90 degrees (+/- about 15 degrees, preferably +/- about 5 degrees) from the horizontal.

Also shown in FIG. 2 is a source of low pressure (L.P.) air 80. As previously mentioned, this air source 80 is also directed upwards to prevent the processed material which exists the nozzle from falling back onto the equipment and causing clogging thereof and other maintenance problems. The low pressure air further assists in removing any remaining moisture which may be present in the processed feedstock material. Any source of low pressure air will suffice for the purposes herein set forth, including fans and other mechanical blowing apparatus. It is best that the pressure provided by this source not exceed a few atmospheres at most. While many in the art may find it counterintuitive to work against gravity with the configuration of both the nozzle and low pressure air source directed upwards, the inventors have instead discovered several unique advantages in practice. One is the vertical space savings achieved by not spraying downwards. With a downwards flow, enough height must be maintained so that material can dry as it exits and falls. In the embodiment of the invention, at least about 20%, and more preferably about half or even about 75% or more of the space requirement can be eliminated. In practice, this can mean a height savings of up to about 10 to 15 feet or more. A processing plant with an extra high roof is no longer a necessity. In addition, it is no longer necessary to ferry raw feedstock material to a higher point of elevation. Less man hours are further expended running up and down stairs for maintenance tasks. The practicality gained by the overall configuration of the apparatus of the invention is therefore significant.

Referring again to FIG. 2, in the present preferred embodiment shear is provided to the feedstock material while in the internal flow condition by directing a stream of high velocity air against the coherent stream exiting the nozzle. The high velocity air can be provided by air stream 42 which can pass through a filter and pressure/flow regulator 41 to an in-line heater 44 and a thermo-couple 43 to control the temperature of the air. The in-line heater 44 can be used to raise the temperature of the air to enhance the free-flow feature of the sheared masses separated from the feedstock stream. Preferably, the air is heated to a temperature of about 130° C. to about 210° C. for sucrose and from about 85° C. to about 180° C. for maltodextrins.

Figure 2A:
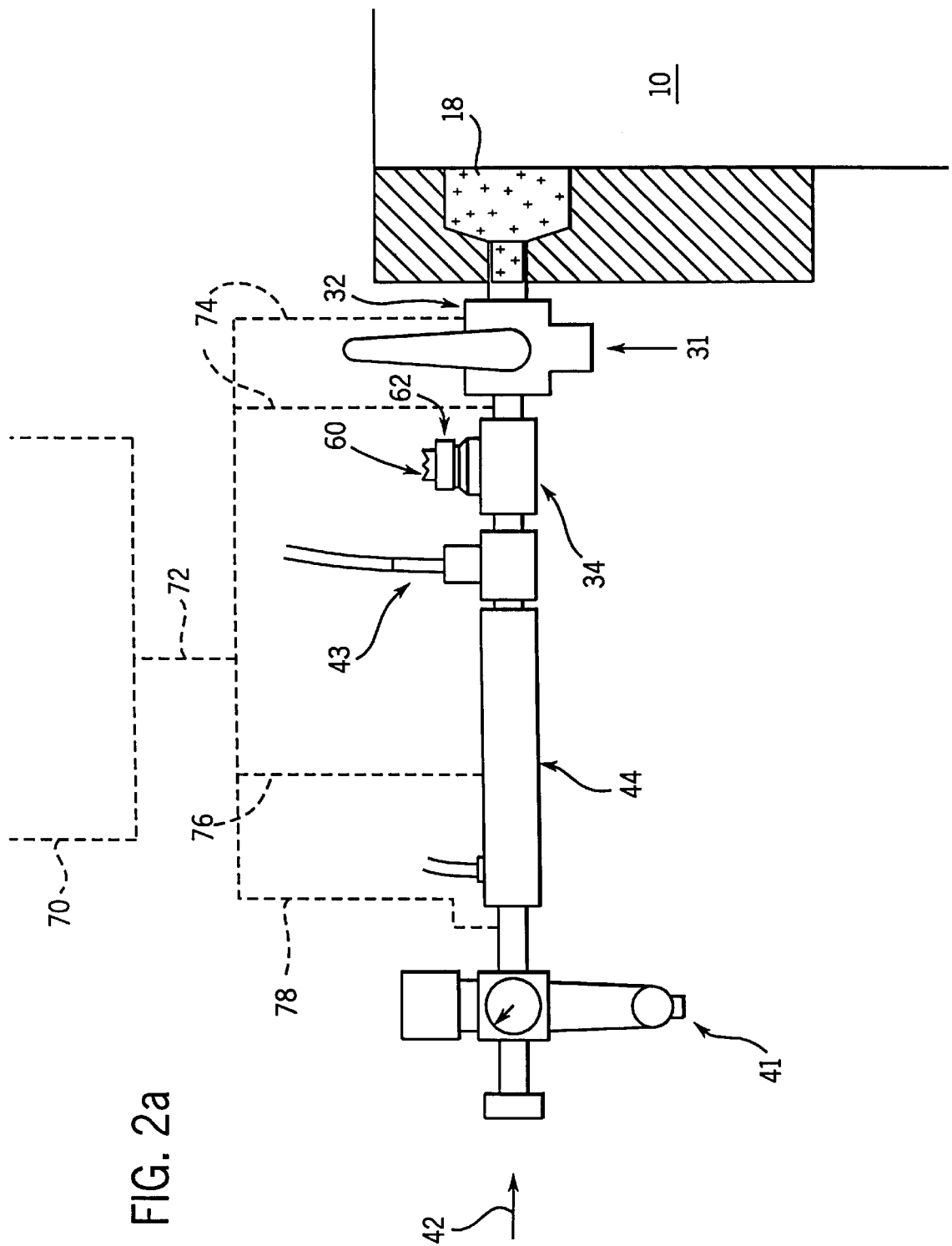

FIG. 2a depicts another embodiment which provides the ability to inject an additive to the feedstock at a point where it will not degrade before being ejected. It is known that some ingredients, especially bio-affecting active ingredients, are heat sensitive and will deteriorate in the presence of prolonged heat condition. The present invention solves this problem by including an additive dispensing vessel 70 from which an additive can be drawn along feedline 72. The new ingredient can then be added along any one of injection ports 74, 76, and 78. Static mixers between 31 and 34 will achieve greater mixing efficiency when the ingredient is added at port 74. It should be understood that the present invention is not limited to the configuration shown in FIG. 2a. Injection ports can be provided at any point in the process and apparatus described herein. The skilled artisan can select the desired configuration depending on the lability of the additive and the characteristics of the apparatus used.

Figure 3:
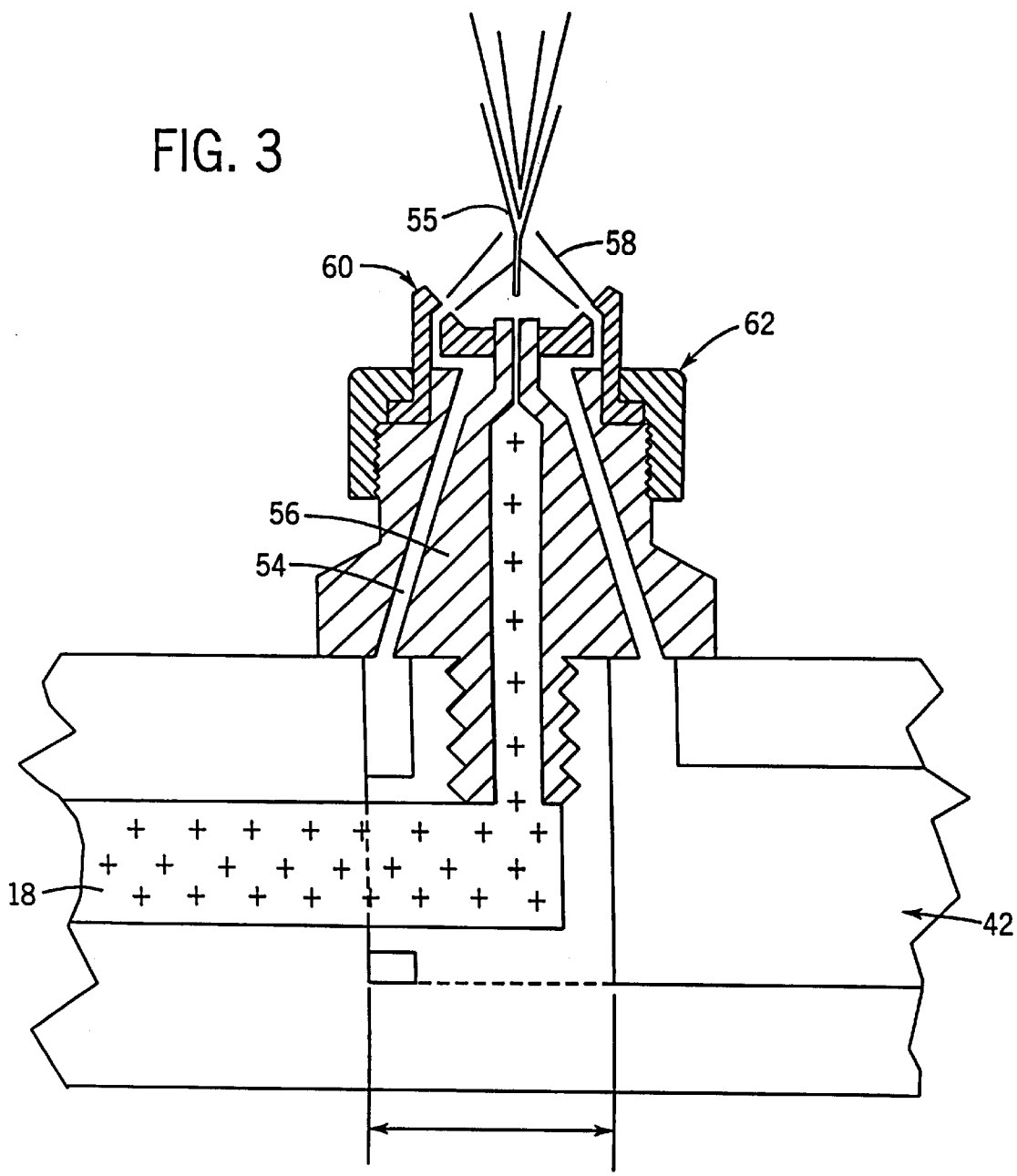

The stream of air is directed against the feedstock exterior by the nozzle to provide discontinuities in the feedstock and basically transform the morphology of the original feedstock to a new morphology achieved by freeflow solidification as discontinuous masses. Referring to FIG. 3, air stream 42 is seen as being in fluid communication with annular channel 54 which surrounds the internal nozzle device 56. Feedstock 18 is shown being fed to the nozzle and exiting as a coherent stream 55 where it is subjected to high-velocity air stream 58 which is created by the combination of tortuous path exits provided by air cap 60 and retaining ring 62.

Other measures can be taken to ensure that the internal flow condition created in the extruder/heater is not lost by heat transfer as the processed feedstock is advanced to the point of shear and beyond to permit free-flow reformation. For example, valve mechanism 32 can be heated to eliminate transfer of heat from the feedstock to a relatively cooler valve mechanism. Moreover, heat can be maintained at the point of shear, generally identified by elements 60 and 62, by directing a heatgun at them during operation or by using a temperature controlled heating band. Alternatively, the temperature of the internal nozzle 56 can be raised or lowered relative to a stream of heated air to prevent transfer of heat from the feedstock and consequent cooling below flow conditions. As the process continues, however, a steady-state temperature of each of the mechanisms will be attained so that additional heat to individual elements of the operations is not required to prevent undue heat transfer and cooling.

When air is used to create the shear force, it is applied in a two-fluid nozzle at a pressure of from about 1.5 to about 20 atmospheres. Preferably, the pressure is applied at about 2 atmospheres to 10 atmospheres. As previously mentioned, the temperature of the air used to create the shear force should preferably be controlled to a temperature at least about 0.1° C. above the temperature of the feedstock being ejected for every atmosphere of pressure.

In each of the Examples which follow shear force was applied through a two-fluid nozzle, shown in FIG. 3, by air fed at a pressure of about 3 atmospheres. The temperature of the air can be maintained before exiting the nozzle at about 185° C. for sucrose and at about 150° C. for maltodextrin. When the pressure of the air at the nozzle shown at FIG. 3 is 2 atmospheres, the velocity of the air impinging on the stream of feedstock is 68 feet per second, and when the pressure is 4 atmospheres, the velocity of air is 95 feet per second.

The unique process and apparatus disclosed herein will be further explained and exemplified in actual experiments, the results of which are set forth hereinbelow. These examples, however, are not meant to limit the scope of the present invention.

EXAMPLES

Experiments have been run which test the premises of the present invention in actual use. The object was to determine whether or not a transformed shearform matrix could be produced from a non-solubilized feedstock. In order to do so, several tests were conducted. Saccharide material (sugar) as the solid feedstock material or carrier was fed to the twin screw extruder together with an oleaginous material to determine whether or not an oleaginous component could be successfully incorporated as part of the shearform matrix product. The results were surprisingly quite favorable and demonstrate that a continuous process can be employed for production on a commercial scale.

Sugar and Oleaginous Material Examples

In the first experiments, a combination of sugar together with oleaginous material was processed in the extruder at a screw speed of three hundred (300) revolutions per minute. The temperature profile of the extruder as well as the feed rate of the feedstock has been set forth in Table 1.

TABLE I

| Experimental No. | Sugar and Oil Feed Rate (Kg/h) | Temperature Profile ° C. Zones | | | | | | |
|---|---|---|---|---|---|---|---|---|
| | | 1 | 2 | 3 | 4 | 5 | 6 | 7 |
| 1 | 38.0 | 30 | 65 | 73 | 73 | 70 | 70 | 70 |
| 2 | 38.0 | 30 | 64 | 71 | 66 | 70 | 71 | 70 |
| 3 | 38.0 | 29 | 74 | 72 | 69 | 70 | 70 | 70 |
| 4 | 38.0 | 30 | 64 | 66 | 68 | 70 | 70 | 70 |
| 5 | 38.0 | 30 | 64 | 64 | 67 | 70 | 70 | 70 |
| 6 | 38.0 | 30 | 66 | 66 | 68 | 70 | 70 | 70 |
| 7 | 38.0 | 30 | 66 | 68 | 71 | 70 | 70 | 70 |
| 8 | 38.0 | 30 | 65 | 73 | 67 | 70 | 70 | 50 |
| 9 | 38.0 | 30 | 64 | 68 | 66 | 70 | 71 | 45 |
| 10 | 38.0 | 29 | 65 | 69 | 65 | 70 | 71 | 45 |
| 11 | 38.0 | 30 | 73 | 68 | 68 | 70 | 70 | 45 |

In each of the experimental runs 1–11, sugar was used as the dry feed. The temperatures shown in Table I start from the first zone (the zone closest to the inlet hopper of the extruder) through the seventh zone (the last zone adjacent to the exit). Oil was added to the feed to determine whether or not the shearform matrix would be able to accommodate an additional ingredient such as an oleaginous material. In particular, liquid oleaginous material was introduced at a rate so as to produce a final product with a consistent oleaginous content of 50% by weight. The feed was ejected from the nozzle under a pressure of about 500 psig, e.g., about 34 atmospheres in an upwards direction. Melt temperature was 71° C. The product ejected from the nozzle attained excellent free-fall, and was a white, opaque bead-like shearform matrix which was quite acceptable in terms of size, appearance and texture. There were no signs of oil separation. The runs 1–11 were continuous over the course of 4 hours. It was thus determined that the process and apparatus devised for producing the new shearform product were dependable on a commercial scale. In each of the experiments set forth above the shearform matrix product possessed a morphology which was quite different from the morphology of the sugar carrier in the feedstock. As a result of the experiment runs set forth above, it has been determined that a dry feedstock material can successfully be transformed into a new matrix for applications in many fields of food and pharmaceutical technology.

Figure 4:
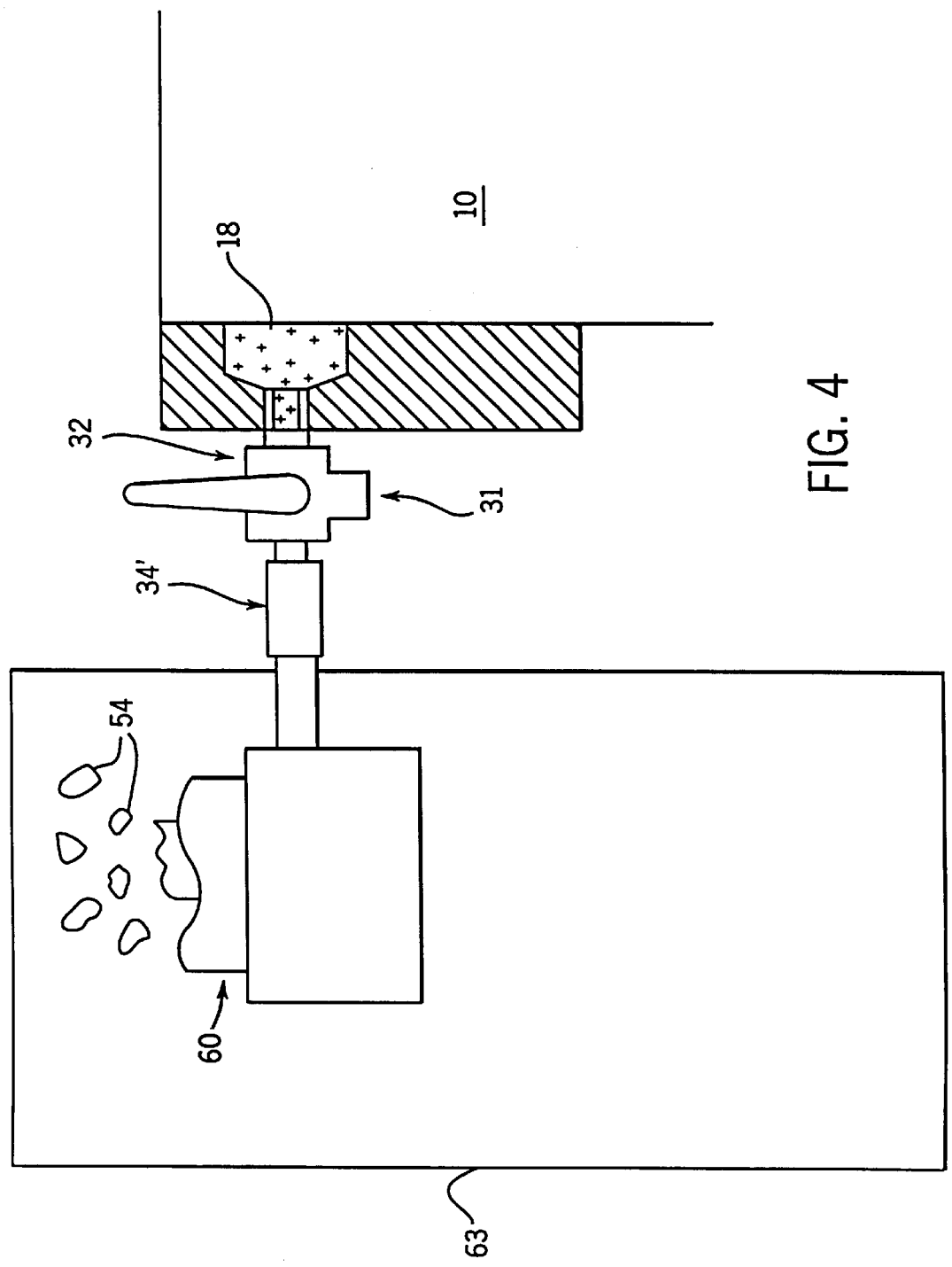
FIG. 4 is a schematic depicting a high velocity nozzle and an environment-maintenance chamber as means for shearing feedstock.

Another embodiment (shown in FIG. 4) utilizes a single fluid nozzle which ejects feedstock 18' at high pressure and velocity, ejecting feedstock from the nozzle at a velocity sufficient to cause instantaneous disruption of the ejected stream in the ambient atmosphere chamber 63. In a present preferred embodiment it has been found that the velocity necessary to form shearform product can be created by providing a pressure of about 2,000 psi. The pressure will of course vary as nozzle size varies. Central to the process is that stream of feedstock be ejected with sufficient velocity to create the separation of the stream into masses of shearform product.

Figure 5:
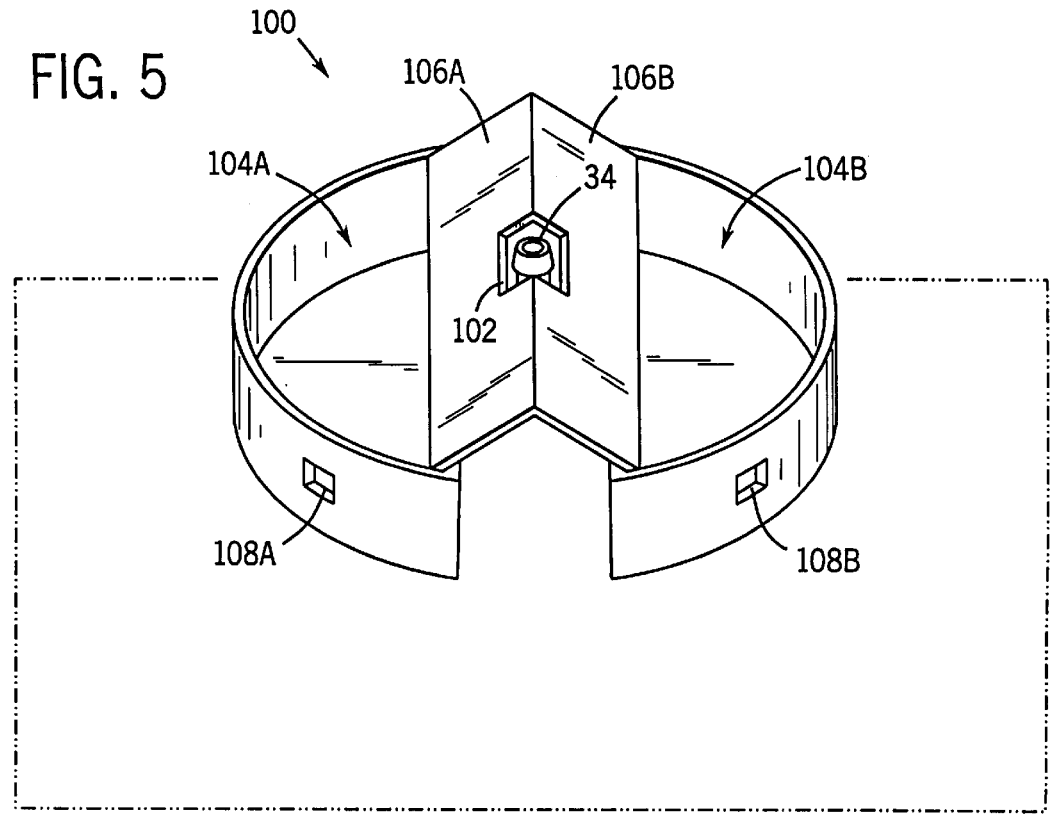
FIG. 5 is a plan view of a collection bin for use with the apparatus herein set forth.

Referring now to FIG. 5, there is shown a collection bin 100 suitable for use as part of the invention set forth herein. Nozzle 34 is positioned through orifice 102. As processed shearform matrix material exits the nozzle, it proceeds with upwards momentum until the countervailing force of gravity causes it to fall back downwards. Collection hoppers 104A and 104B on either side of the orifice 102 then collect the falling material. Sides 106A and 106B, respectively, of the collection hoppers are preferably sloped to passively assist the collection hopper in gathering the material. The collection bin 100 may be constructed of any substantially durable material known in the art, preferably metal, alloy or polymer, and may be removably or permanently affixed to the apparatus 10 by means known in the art. Material may be scooped from 104A or 104B, or access may be provided by ports 108A and 108B, respectively. Ports 108A and 108B can be open, or provided with hinged access means (not shown).

Thus, while there have been described what are presently believed to be the preferred embodiments of the present invention, those skilled in the art will realize that other and further modifications can be made without departing from the true spirit of the invention, and is intended to include all such modifications and variations as come within the scope of the claims as set forth below.

What is claimed is:

1. A process for making a shearform matrix comprising:
   a) increasing the temperature of a feedstock which includes a solid non-solubilized carrier material to the point where it will undergo internal flow with the application of a fluid shear force;
   b) upwardly ejecting a stream of said heated feedstock resulting from step (a) under pressure from at least one orifice;
   c) then subjecting said feedstock to disruptive fluid shear force which separates the flow of feedstock into multiple parts and transforms the morphology of said feedstock; and
   d) directing low pressure air upwards against said transformed feeock to promote free fall of said feedstock away from said orifice.

2. A process according to claim 1 wherein said multiple parts are cooled to a temperature below said internal flow point immediately after contact with said fluid shear forces and separation of said stream into multiple parts.

3. The process of claim 1 wherein an environment is provided for said multiple parts to reform as solid shearform matrix under conditions which permit free-flow until solidification.

4. The process of claim 1 wherein said carrier material selected from the group consisting of saccharide-based materials, thermoplastic polymers, biodegradable polymers, and cellulosics.

5. The process of claim 4 wherein said feedstock comprises an oleaginous material selected from the group consisting of vegetable oils, soy bean oil, canola oil, corn oil, sunflower oil, animal fats, tallows, lards, fish oils, crustacean oils, and mixtures thereof.

6. The process of claim 5 wherein said feedstock further comprises an additive selected from the group consisting of bio-affecting agents, dyes, fragrances, crystallization control agents, sweeteners, flavors, and mixtures thereof.

7. The process of claim 1 wherein said temperature is controlledly increased to said internal flow point in the substantial absence of heating beyond said point and with minimum residence time during said controlled temperature increase.

8. The process of claim 7 herein said controlled temperature increase is provided by passing said feedstock through a feeder chamber having multiple temperature control zones.

9. The process of claim 8 herein said feedstock is passed through said multiple zones under conditions which prevent heating substantially beyond said internal point and which minimizes time in said chamber.

10. The process of claim 4 wherein said fluid shear force results from directing a fluid at high velocity at said stream of extrudate.

11. The process of claim 10 wherein said feedstock is sucrose and said fluid is air maintained at a temperature of from about 160° C. to about 200° C. and ambient atmosphere has a relative humidity of less than 30% RH.

12. The process of claim 10 wherein said feedstock is maltodextrin and said fluid is air maintained at a temperature of from about 85° C. to about 180° C. and ambient atmosphere.

13. The process of claim 4 wherein said fluid shear force results from extruding said feedstock through said nozzle at high velocity against a fluid atmosphere at a condition which provides discrete, discontinuous masses.

14. An apparatus for making a shearform matrix comprising:
    means for increasing the temperature and applied pressure on a non-solubilized feedstock material to the point where it will undergo internal flow and simultaneously advance feedstock for ejection;
    means for upwardly ejecting said feedstock in a condition for shearing said feedstock to provide said shearform matrix, said means for ejecting in fluid communication with said means for increasing the temperature and pressure and arranged to receive said feedstock material during said internal flow condition;
    means for shearing said feedstock fixed proximally to said means for ejection and disposed for effecting shear of said feedstock during said internal flow condition whereby said feedstock material is transformed to said shearform matrix;
    means for directing low pressure air upwards against said transformed feedstock to promote free fall of said feedstock away from said orifice.

15. The apparatus of claim 14 wherein said means for increasing the temperature comprises a multiple-zone chamber having selectively treatable zones and a continuous throughput mechanism for advancing said feedstock.

16. The apparatus of claim 15 wherein said throughput mechanism comprises at least one screw mechanism for extruding said feedstock.

17. The apparatus of claim 16 wherein said means is a twin screw extruder having at least four heating zones.

18. The apparatus of claim 17 wherein said means for ejecting is a high pressure nozzle.

19. The apparatus of claim 18 wherein said nozzle is a low velocity nozzle which provides a substantially coherent stream of said feedstock at an exit orifice.

20. The apparatus of claim 19 wherein said nozzle is a high velocity nozzle having at least one opening for ejecting feedstock at high velocity.

21. The apparatus of claim 17 wherein said means for shearing said feedstock comprises means for delivering fluid for high velocity against feedstock as it exits said means for ejecting.

22. The apparatus of claim 21 wherein said means for delivering fluid comprises an external atomizing nozzle.

23. The apparatus of claim 22 wherein said means for shearing comprises an environment-maintenance chamber which maintains an environment which induces shear upon collision of said high velocity feedstock against said environment.

24. The apparatus of claim 23 wherein said apparatus comprises means for injecting an additive to said feedstock at a point proximal said nozzle.

25. The apparatus of claim 14, further comprising a collection bin.

26. An apparatus for making a shearform matrix comprising:
    a twin-screw extruder for increasing the temperature and applied pressure on a non-solubilized feedstock material to the point where it will undergo internal flow and simultaneously advance feedstock for ejection;
    a nozzle for upwardly ejecting said feedstock in a condition for external shearing of said feedstock to provide said shearform matrix, said nozzle for ejecting being in fluid communication with said extruder and arranged to receive said feedstock material during said internal flow condition; and
    a fluid stream for shearing said feedstock, said fluid stream being fixed proximally to said nozzle for ejection and disposed for effecting external shear of said feedstock during said internal flow condition whereby said feedstock material is transformed to said shearform matrix; and
    source of low pressure air positioned underneath said nozzle for directing low pressure air upwards around said nozzle; and
    a collection bin for removably holding said shearform matrix after ejection from said nozzle.

27. The apparatus of claim 26 wherein said screw extruder has at least four heating zones.

28. The apparatus of claim 27 wherein said nozzle is a high pressure nozzle.

29. The apparatus of claim 28 wherein said high pressure nozzle has at least one opening for ejecting feedstock at high velocity.

30. The apparatus of claim 26 wherein said nozzle is a low velocity nozzle which provides a substantially coherent stream of said feedstock at an exit orifice.

31. The apparatus of claim 26 wherein said fluid stream is provided by an external atomizing nozzle.

32. The apparatus of claim 26, further comprising means for injecting an additive to said feedstock at a point proximal to said nozzle.

33. The apparatus of claim 26 wherein said apparatus results in a vertical space savings of at least about 20% relative to an apparatus in which feedstock is ejected downwards.

34. The apparatus of claim 33 wherein said apparatus results in a vertical space savings of at least about 50% reLative to an apparatus in which feedstock is ejected downwards.

35. The apparatus of claim 34 wherein said apparatus results in a vertical space savings of at least about 75% relative to an apparatus in which feedstok is ejected downwards.

36. The apparatus of claim 26, wherein said collection bin is sloped to passively assist collection of said shearform matrix material.

37. The apparatus of claim 25, wherein said collection bin is sloped to passively assist collection of said shearform matrix material.

38. The apparatus of claim 26, wherein said low pressure air source is a fan.

39. The apparatus of claim 14, wherein said means for directing low pressure air is a fan.

40. The apparatus of claim 37, wherein said means for directing low pressure air is a fan.

* * * * *